US010944645B2

United States Patent
Mátray et al.

(10) Patent No.: US 10,944,645 B2
(45) Date of Patent: Mar. 9, 2021

(54) NODE OF A NETWORK AND A METHOD OF OPERATING THE SAME FOR RESOURCE DISTRIBUTION

(71) Applicant: Telefonaktiebolaget LM Ericsson (publ), Stockholm (SE)

(72) Inventors: Péter Mátray, Budapest (HU); Dániel Géhberger, Budapest (HU); Gabor Nemeth, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 55 days.

(21) Appl. No.: 16/306,173

(22) PCT Filed: Jun. 1, 2016

(86) PCT No.: PCT/EP2016/062412
§ 371 (c)(1),
(2) Date: Nov. 30, 2018

(87) PCT Pub. No.: WO2017/207049
PCT Pub. Date: Dec. 7, 2017

(65) Prior Publication Data
US 2020/0084121 A1    Mar. 12, 2020

(51) Int. Cl.
G06F 15/173 (2006.01)
H04L 12/24 (2006.01)
H04L 29/08 (2006.01)

(52) U.S. Cl.
CPC ...... *H04L 41/5051* (2013.01); *H04L 41/5096* (2013.01); *H04L 67/10* (2013.01)

(58) Field of Classification Search
CPC .. H04L 41/5051; H04L 41/5096; H04L 67/10
(Continued)

(56) References Cited

U.S. PATENT DOCUMENTS 5,608,171 A * 3/1997 Hunter .................... G01F 1/363
73/215
7,124,110 B1 * 10/2006 Kemp, II ............... G06Q 40/04
705/37

(Continued)

FOREIGN PATENT DOCUMENTS

JP    2012069056 A    4/2012

OTHER PUBLICATIONS

Guo, Zhenhua, et al., "Investigation of Data Locality in MapReduce", Proceedings of the 2012 12th IEEE/ACM International Symposium on Cluster, Cloud and Grid Computing (ccgrid 2012). IEEE Computer Society, 2012, pp. 1-8.

(Continued)

*Primary Examiner* — Hannah S Wang
(74) *Attorney, Agent, or Firm* — Murphy, Bilak & Homiller, PLLC

(57) ABSTRACT

There is provided a node of a network and a method of operating the same. According to the method, data transmissions between a plurality of resources at the node of the network are monitored (400). A pattern in the monitored data transmissions is identified between the plurality of resources at the node of the network (402). A distribution of the plurality of resources at the node of the network the network is adapted based on the identified pattern in the monitored data transmissions (404).

25 Claims, 7 Drawing Sheets

(58) Field of Classification Search
USPC .......................................................... 709/226
See application file for complete search history.

(56) References Cited

U.S. PATENT DOCUMENTS

| | | | |
|---|---|---|---|
| 7,634,566 B2 | 12/2009 | Turner et al. | |
| 8,355,491 B1* | 1/2013 | Butt | H04M 3/436 |
| | | | 379/208.01 |
| 8,924,978 B2 | 12/2014 | Meng et al. | |
| 8,972,986 B2 | 3/2015 | Palanisamy et al. | |
| 2002/0152237 A1* | 10/2002 | Cohen | G06F 3/14 |
| | | | 715/205 |
| 2010/0150028 A1* | 6/2010 | Campbell | H04L 41/145 |
| | | | 370/255 |
| 2012/0105733 A1* | 5/2012 | Ryu | H04N 21/485 |
| | | | 348/731 |
| 2013/0042003 A1 | 2/2013 | Franco et al. | |
| 2013/0073670 A1* | 3/2013 | Das | G06F 9/5027 |
| | | | 709/217 |
| 2013/0120442 A1* | 5/2013 | Dhawan | G06T 3/0012 |
| | | | 345/629 |
| 2013/0326038 A1* | 12/2013 | Bodik | G06F 9/4856 |
| | | | 709/223 |
| 2014/0196041 A1* | 7/2014 | Takamura | G06F 9/5088 |
| | | | 718/1 |
| 2014/0280243 A1* | 9/2014 | Lee | G06F 16/2457 |
| | | | 707/751 |
| 2016/0043910 A1* | 2/2016 | Khosrowpour | G06F 9/45558 |
| | | | 709/224 |
| 2016/0072886 A1* | 3/2016 | Lin | H04L 67/42 |
| | | | 709/213 |
| 2016/0088066 A1* | 3/2016 | Thomas | H04L 43/08 |
| | | | 709/203 |
| 2017/0272972 A1* | 9/2017 | Egner | H04W 28/0268 |

OTHER PUBLICATIONS

Kirkpatrick, S., et al., "Optimization by Simulated Annealing", Science, New Series, vol. 220, No. 4598, May 1983, pp. 671-680.
Pai, Vivek S, et al., "Locality-Aware Request Distribution in Cluster-based Network Servers", ACM Sigplan Notices. vol. 33. No. 11. ACM, 1998, pp. 1-12.
Plaxton, C. Greg, et al., "Accessing Nearby Copies of Replicated Objects in a Distributed Environment", Theory of Computing Systems 32.3, 1999, pp. 311-320.
Zhang, Qi, et al., "Dynamic Service Placement in Geographically Distributed Clouds", 2012 32nd IEEE International Conference on Distributed Computing Systems, Jun. 2012, pp. 526-535.

* cited by examiner

NODE OF A NETWORK AND A METHOD OF OPERATING THE SAME FOR RESOURCE DISTRIBUTION

TECHNICAL FIELD

The present idea relates to a node of a network and a method of operating the same for resource distribution.

BACKGROUND

Most applications (including cloud applications) are composed of multiple processing components that communicate with each other. Communication can take place via data services (for example, offline storage such as files, databases, or the like), data streams or main-memory databases. For example, in a virtualised telecommunication network, user packets are forwarded through a chain of virtualised network functions, which can access necessary context information from shared memory databases. Similarly, big data analytics systems typically process their input in multiple stages, often combining data from multiple sources.

To ensure scalability in these systems, the data and processing is handled in a distributed manner. In other words, the data and processing is spread across multiple physical server machines that may reside in different racks, or at different geographic locations. Hence, when applications are executed, the applications induce a complex communication mesh between computing and data servicing instances.

The cost of the generated network communication heavily depends on locality. For example, the performance gap between accessing data at a local host and accessing data at a local rack can be 30% or more. In large-scale multi-data center deployments, this gap can easily grow orders of magnitudes higher. Consequently, the density and layout of the communication mesh for an application has a serious impact on both application performance and networking resources. The costs associated with remote network data access are often so high that they become the limiting factor in the overall processing speed.

While some systems exist that take into account user locality to optimise client data access, these existing systems support data locality only for a limited class of computations that process data from a single input source. For example, offline data may be stored in a distributed file system and whenever an application process is launched, processes are allocated on the nodes that hold the input data blocks to be processed.

An example system is disclosed in "Volley: Automated Data Placement for Geo-Distributed Cloud Services", by Sharad Agarwal et al, Microsoft Research, in which an automated data placement system optimises data locality for user-facing cloud services. Although this system takes into account data-interdependencies, it is only concerned with locality optimisation on the scale of geographic continents. The spring model that is disclosed attempts to bring data items closer to users and to other data items that they communicate with regularly. However, the model does not take into account resource placement within a data center. In contrast, data items are simply moved between data centers since the aim of the system is to provide automated mechanisms to place application data across data centers.

Streaming systems can provide a certain level of locality support. For example, stateful load balancers can distribute packets (or requests) in a consistent manner such that packets belonging to the same context are always forwarded to the same processing instance. Also, message-based systems can subdivide data streams into smaller partitions and consistently route messages within a partition to the same consumer instance. The advantage of these techniques is that they enable consumer instances to operate on a local copy of states or contexts for their assigned partition.

Existing solutions such as those described above assume that input data for each computation step can be split into disjoint partitions and that computations can be performed locally on each partition. However, many modern cloud applications fail to match this assumption as they read multiple data sources as input. For example, telecommunications systems correlate live network data (such as user traffic type, cell load, or similar) with more static databases (such as network topology or coverage, customer relationship management CRM, terminal capability, or similar) to ensure positive user experience. Also, typical industrial internet of things (IoT) applications also combine multiple sources. For example, in order to effectively assist (or control) connected cars from the cloud, the streaming of car sensor data is correlated with live traffic information, mapping and routing data, historical driver profiles, and similar.

In such cases, it is not possible to partition data sources in such a way that the partitions can be processed locally. In contrast, a full mesh communication is required to ensure that all partitions from one source can be linked with all partitions from the other source. As explained above, this type of full mesh communication does not scale well and quickly degrades performance in large-scale cloud deployments.

SUMMARY

It is an object of the idea to obviate or eliminate at least some of the above disadvantages and provide an improved means for resource distribution at a node.

Therefore, according to an aspect of the idea, there is provided a method of operating a node of a network. The method comprises monitoring data transmissions between a plurality of resources at the node of the network, identifying a pattern in the monitored data transmissions between the plurality of resources at the node of the network, and adapting a distribution of the plurality of resources at the node of the network based on the identified pattern in the monitored data transmissions.

In this way, an improved means for resource distribution at a node is provided. In particular, data locality in distributed execution environments is improved. By monitoring a pattern in the data transmissions (i.e. by monitoring a communication mesh), it is possible to optimise the physical layout of the mesh. In this way, performance of the network is enhanced and processing times are reduced. The method can be employed both within and across nodes. The method can also be employed for applications that combine multiple data sources. Moreover, there is no need for manually partitioning data since the method can dynamically adapt to changing conditions based on observed data transmission patterns. The idea provides faster data transmission by optimising the routes for data transmissions and thus provides efficient network utilisation.

The data transmissions between the plurality of resources may be data transmissions associated with data access. In this way, the idea provides faster data access.

The plurality of resources may comprise at least one resource within the node of the network, or at least one resource within another node of the network, or at least one resource within the node of the network and at least one resource within another node of the network. In this way, the method can be employed within and across nodes (for example, data centers). An improved means for resource distribution both within and across nodes is thus provided, thereby reducing processing speeds both within and across nodes to obtain a more efficient network.

Alternatively or in addition, the plurality of resources may comprise at least one data source, or at least one processing instance, or at least one data source and at least one processing instance. In this way, the idea can be applied to many types of resource in order to provide the optimum resource distribution across all resources.

In some embodiments, adapting a distribution of the plurality of resources at the node of the network based on the identified pattern in the monitored data transmissions may comprise moving at least one of the plurality of resources from a first location within the node of the network to a second location within the node of the network based on the identified pattern in the monitored data transmissions. In this way, the resources can be redistributed to locations that will optimise the distribution and thus more efficient data transmissions between those resources is achieved.

In some embodiments, adapting a distribution of the plurality of resources at the node of the network based on the identified pattern in the monitored data transmissions may comprise or may further comprise adding at least one resource to the plurality of resources based on the identified pattern in the monitored data transmissions. In this way, it is possible to create additional resources and thus increase the amount of resources that are available whilst optimising the distribution of those resources.

In some embodiments, adapting a distribution of the plurality of resources at the node of the network based on the identified pattern in the monitored data transmissions may comprise or may further comprise deleting at least one of the plurality of resources based on the identified pattern in the monitored data transmissions. In this way, resources (such as unused or empty resources) can be removed to optimise the resource space that is available and simplify the communication mesh to enable more efficient data transmissions.

In some embodiments, adapting a distribution of the plurality of resources at the node of the network based on the identified pattern in the monitored data transmissions may comprise or may further comprise moving at least one of the plurality of resources from a first location within the node of the network to a second location within another node of the network based on the identified pattern in the monitored data transmissions. In this way, it is possible for resources to be redistributed to locations outside the node to optimise the distribution of resources within and between those nodes. In this way, the speed of data transmissions between those resources to improve the efficiency of the network is improved.

The identified pattern in the monitored data transmissions may comprise a distance value for data transmissions between the plurality of resources, wherein the distance value is indicative of the distance between respective resources. In this way, it is possible to optimise the distribution of resources based on the distance between those resources. For example, resources can be moved closer together or further away in order to optimise the distribution of resources and increase the speed of transmissions between those resources.

The identified pattern in the monitored data transmissions may comprise or may further comprise a frequency access value for data transmissions between the plurality of resources, wherein the frequency access value is indicative of the frequency with which respective resources access each other. In this way, it is possible to optimise the distribution of resources based on the frequency with which resources are accessed. For example, resources that access each other frequently can be placed closer together to make the transmissions between those resources quicker.

The identified pattern in the monitored data transmissions may comprise or may further comprise a latency value for data transmissions between the plurality of resources. In some embodiments, if the latency value for data transmissions between two of the plurality of resources is more than the first threshold value, adapting the distribution of the plurality of resources at the node of the network may comprise or may further comprise moving the two of the plurality of resources closer to each other. In this way, it is possible to reduce the delay in transmissions between resources by positioning those resources closer together, thereby improving transmission speeds and allowing faster resource access.

The identified pattern in the monitored data transmissions may comprise or may further comprise a value for the number of data transmissions between the plurality of resources. In some embodiments, if the value for the number of data transmissions between two of the plurality of resources is more than the second threshold value, adapting the distribution of the plurality of resources at the node of the network may comprise or may further comprise moving the two of the plurality of resources closer to each other. In this way, resources having a high volume of data transmissions between them can be placed closer together to improve the speed of those transmissions and allow fast resource access.

The identified pattern in the monitored data transmissions may comprise or may further comprise a value for the number of data transmissions between the plurality of resources in a set time period. In some embodiments, if the value for the number of data transmissions between the plurality of resources in the set time period is less than a third threshold value, adapting the distribution of the plurality of resources at the node of the network may comprise or may further comprise maintaining the distribution of the plurality of resources, and if the value for the number of data transmissions between the plurality of resources in the set time period is more than the third threshold value, adapting the distribution of the plurality of resources at the node of the network may comprise or may further comprise moving at least one of the plurality of resources from a first location to a second location. In this way, it can be checked at regular intervals whether resource redistribution will improve the efficiency of data transmissions and resources can be redistributed at those regular intervals, if required, to ensure the resource distribution remains optimised.

In some embodiments, adapting the distribution of the plurality of resources at the node of the network may comprise or may further comprise adapting the distribution of the plurality of resources at the node of the network based on a cost of data transmissions for the distribution, wherein the cost is determined from the identified pattern in the monitored data transmissions. In this way, it is possible to optimise the resource distribution by reducing the cost of data transmissions.

In some embodiments, adapting the distribution of the plurality of resources at the node of the network based on a cost of data transmissions may comprise determining a first cost of data transmissions for the distribution of the plurality of resources from the identified pattern in the monitored data transmissions, determining a second cost of data transmissions for a candidate redistribution of the plurality of resources, and comparing the determined second cost with the determined first cost. If the determined second cost is less than the determined first cost, the distribution of the plurality of resources at the node may be adapted by redistributing the plurality of resources according to the candidate redistribution of the plurality of resources and, if the determined second cost is equal to or more than the determined first cost, the distribution of the plurality of resources may be maintained. In this way, the optimum distribution of resources can be determined and implemented by reducing the cost of data transmissions.

The identified pattern in the monitored data transmissions may comprise at least one distance value indicative of a distance between resources of the plurality of resources for which at least one data transmission occurs and, for each at least one distance value, a corresponding frequency value indicative of the frequency of the at least one data transmission, and the first cost may be determined as the sum of the products of the at least one distance value and corresponding frequency values. In this way, an indication of the cost of the current distribution can be acquired.

In some embodiments, adapting the distribution of the plurality of resources at the node of the network may comprise or may further comprise determining an optimum distribution of the plurality of resources at the node of the network based on the identified pattern in the monitored data transmissions using simulated annealing, and adapting a distribution of the plurality of resources at the node based on the determined optimum distribution of the plurality of resources at the node of the network. In this way, it is possible to statistically guarantee acquiring an optimal distribution of resources and thus improve data transmission speeds more effectively.

In some embodiments, the pattern in the monitored data transmissions may be identified from a generated model of the physical layout of the plurality of resources and the data transmissions between the plurality of resources. In this way, a representation of the resources can be generated to aid in pattern identification.

According to another aspect of the idea, there is provided a computer program product, comprising a carrier containing instructions for causing a processor to perform a method as defined above.

According to another aspect of the idea, there is provided a node of a network. The node comprises a processing unit operable to monitor data transmissions between a plurality of resources, identify a pattern in the monitored data transmissions between the plurality of resources, and adapt a distribution of the plurality of resources based on the identified pattern in the monitored data transmissions.

According to these aspects, the idea provides an improved resource distribution at a node. By monitoring a pattern in the data transmissions (i.e. by monitoring a communication mesh), it is possible to optimise the physical layout of the mesh. In this way, performance of the network is enhanced and processing times are reduced.

The node may be a data center. In this way, resource distribution can be optimised both within and across data centers to improve data transmissions speeds both within and across those data centers to provide a more efficient network of data centers.

In some embodiments, the processing unit may be operable to adapt a distribution of the plurality of resources based on the identified pattern in the monitored data transmissions by moving at least one of the plurality of resources from a first location within the node to a second location within the node based on the identified pattern in the monitored data transmissions. In this way, the resources can be redistributed to locations that will optimise the distribution and thus more efficient data transmissions between those resources is provided.

The processing unit may be operable or further operable to adapt a distribution of the plurality of resources based on the identified pattern in the monitored data transmissions by adding at least one resource to the plurality of resources based on the identified pattern in the monitored data transmissions. In this way, it is possible to create additional resources and thus increase the amount of resources that are available whilst optimising the distribution of those resources.

The processing unit may be operable or further operable to adapt a distribution of the plurality of resources based on the identified pattern in the monitored data transmissions by moving at least one of the plurality of resources from a first location within the node to a second location within another node of the network based on the identified pattern in the monitored data transmissions. In this way, it is possible for resources to be redistributed to locations outside the node to optimise the distribution of resources within and between those nodes. In this way, the speed of data transmissions between those resources is achieved to improve the efficiency of the network.

According to another aspect of the idea, there is provided a node of a network. The node comprises a monitor module configured to monitor data transmissions between a plurality of resources, an identification module configured to identify a pattern in the monitored data transmissions between the plurality of resources, and an adaption module configured to adapt a distribution of the plurality of resources based on the identified pattern in the monitored data transmissions.

According to another aspect of the idea, there is provided a network. The network comprises at least one node, wherein one or more of the at least one nodes is as defined above.

In this way, an improved means for resource distribution at a node is provided. Specifically, data locality in distributed execution environments is improved, where scalability is ensured via the partitioning of data models and the parallelisation of processing. The continuous monitoring of a pattern in the data transmissions (i.e. a communication mesh), such as for an application, and analysis of the relationships between resources, such as data sources and processing instances, enables the physical layout of the mesh to be optimised. In this way, network performance is enhanced and processing times are reduced.

The method can be employed both within and across nodes (for example, data centers). The method can also be employed for applications that combine multiple data sources. Moreover, there is no need for manually partitioning data since the system can dynamically adapt to changing conditions based on observed data transmission (for example, data access) patterns. The idea provides fast data transmissions, fast data access and efficient network utilisation.

This can be particularly useful in the case of real-time applications (such as telecommunication services or industrial control systems) that pose strict requirements on the end-to-end processing time of input events.

BRIEF DESCRIPTION OF THE DRAWINGS

For a better understanding of the present idea, and to show how it may be put into effect, reference will now be made, by way of example, to the accompanying drawings, in which.

DETAILED DESCRIPTION

Figure 1:
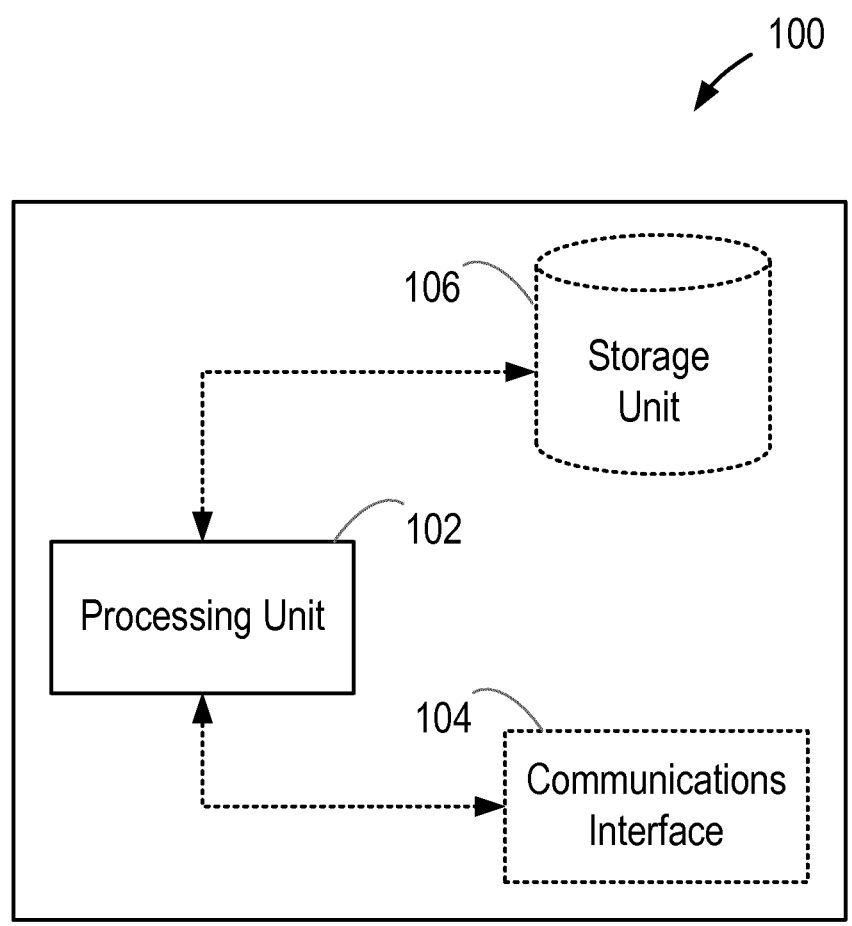
FIG. 1 is a block diagram illustrating a node of a network.

FIG. 1 illustrates a node 100 of a network in accordance with the idea. The network comprises at least one node. One or more of the at least one nodes of the network is the node 100 as illustrated and described with reference to FIG. 1. The node 100 can be, for example, a data center in the network. The node 100 comprises a processing unit 102. The processing unit 102 controls the operation of the node 100 and can implement the method described herein.

The processing unit 102 can comprise one or more processors, processing units, multi-core processors or modules that are configured or programmed to control the node 100 in the manner described herein. In particular implementations, the processing unit 102 can comprise a plurality of software and/or hardware modules that are each configured to perform, or are for performing, individual or multiple steps of the method disclosed herein.

Briefly, the processing unit 102 is operable to monitor data transmissions between a plurality of resources, identify a pattern in the monitored data transmissions between the plurality of resources and adapt a distribution of the plurality of resources based on the identified pattern in the monitored data transmissions. The data transmissions between the plurality of resources can be data transmissions associated with data access or any other type of data transmissions.

In some embodiments, the plurality of resources can comprise at least one resource within the node 100 of the network. In other embodiments, the plurality of resources can comprise at least one resource within another node of the network. In other embodiments, the plurality of resources can comprise at least one resource within the node 100 of the network and at least one resource within another node of the network. The plurality of resources may comprise any type of resource or combination of resources. For example, the plurality of resources may comprise at least one data source, at least one part of a partitioned data source, at least one processing instance, at least one database, at least one part of a partitioned database, or any combination thereof.

Optionally, the node 100 also comprises a communications interface 104 connected to the processing unit 102 of the node 100. The communications interface 104 may be operable to communicate with one or more other nodes in the network. Optionally, the node 100 also comprises a storage unit 106 connected to the processing unit 102 of the node 100. The storage unit 106 may be operable to store program code that can be executed by the processing unit 102 to perform the method described herein. The storage unit 106 can also be used to store information, data, signals and measurements made or acquired by the processing unit 102 of the node 100.

Figure 2:
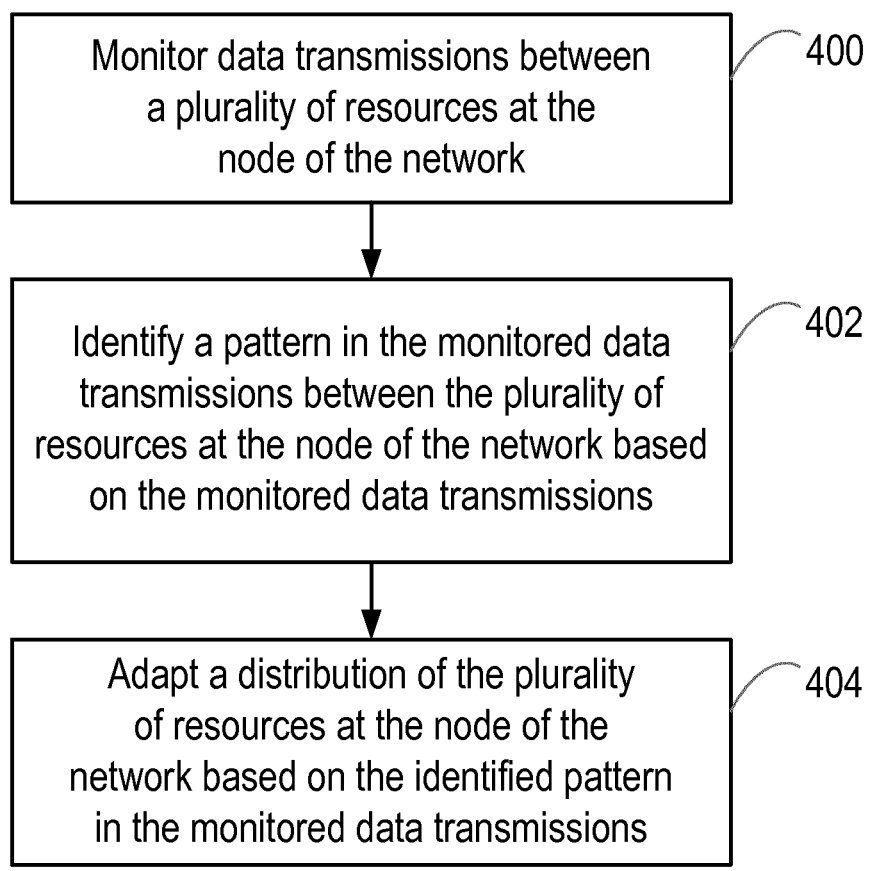
FIG. 2 is a flow chart illustrating a process performed by a node of a network.

FIG. 2 illustrates a method for operating the node 100 of a network in accordance with an embodiment.

With reference to FIG. 2, at block 400, the processing unit 102 of the node 100 monitors data transmissions between a plurality of resources at the node 100. As previously mentioned, the data transmissions between the plurality of resources can be data transmissions associated with data access. Although this example has been provided, it will be understood that the data transmissions between the plurality of resources can be any other type of data transmission. The processing unit 102 of the node 100 may continuously monitor the data transmissions between a plurality of resources at the node 100.

At block 402, the processing unit 102 of the node 100 identifies a pattern in the monitored data transmissions between the plurality of resources at the node 100. For example, the processing unit 102 of the node 100 can acquire a model of the physical layout of the plurality of resources at the node 100 and the data transmissions between the plurality of resources at the node 100 in order to determine which of the plurality of resources are in communication with each other. In effect, the processing unit 102 of the node 100 can acquire a communication mesh for the plurality of resources at the node 100.

Based on the acquired model (or communication mesh), the processing unit 102 of the node 100 can acquire any patterns (such as data access patterns) in the monitored data transmissions between the plurality of resources at the node 100. The pattern in the monitored data transmissions may comprise any pattern that enables the distribution of the plurality of resources to be adapted to optimise the physical layout of the plurality of resources. For example, a pattern in the monitored data transmissions can include hot spots in communication, correlated use of certain data elements, or any other pattern.

In some embodiments, the identified pattern in the monitored data transmissions comprises a distance value for data transmissions between the plurality of resources. The distance value is indicative of the distance between respective resources. This may be, for example, the number of hops between respective resources or the physical distance between respective resources or both. In some embodiments, the identified pattern in the monitored data transmissions comprises a frequency access value for data transmissions between the plurality of resources. The frequency access value is indicative of the frequency with which respective resources access each other. In some embodiments, the identified pattern in the monitored data transmissions comprises both the distance value for data transmissions between the plurality of resources and the frequency access value for data transmissions between the plurality of resources.

In some embodiments, the identified pattern in the monitored data transmissions comprises a latency value for data transmissions between the plurality of resources. In some embodiments, the identified pattern in the monitored data transmissions comprises a value for the number of data transmissions between the plurality of resources. In some embodiments, the identified pattern in the monitored data transmissions comprises a value for the number of data transmissions between the plurality of resources in a set time period.

Although examples have been provide for the identified pattern in the monitored data transmissions, it will be understood that the identified pattern in the monitored data transmissions may comprise any combination of these examples or any other identified pattern or combination of identified patterns.

At block 404, the processing unit 102 of the node 100 adapts a distribution of the plurality of resources at the node 100 based on the identified pattern in the monitored data transmissions. The distribution of the plurality of resources at the node 100 may be adapted in a variety of ways based on the identified pattern in the monitored data transmissions. For example, the layout adaptation can be executed by repartitioning data sources, redistributing database partitions, relocating application (or compute) instances, reconfiguring transmission routing, or similar.

In one example, the processing unit 102 of the node 100 may adapt the distribution of the plurality of resources at the node 100 based on the identified pattern in the monitored data transmissions by moving at least one of the plurality of resources from a first location within the node 100 to a second location within the node 100 based on the identified pattern in the monitored data transmissions.

In another example, the processing unit 102 of the node 100 may adapt the distribution of the plurality of resources at the node 100 based on the identified pattern in the monitored data transmissions by moving at least one of the plurality of resources from a first location within the node 100 of the network to a second location within another node of the network based on the identified pattern in the monitored data transmissions.

In another example, the processing unit 102 of the node 100 may adapt the distribution of the plurality of resources at the node 100 based on the identified pattern in the monitored data transmissions by adding at least one resource to the plurality of resources based on the identified pattern in the monitored data transmissions. For example, the processing unit 102 of the node 100 may create a resource partition. In another example, the processing unit 102 of the node 100 may adapt the distribution of the plurality of resources at the node 100 based on the identified pattern in the monitored data transmissions by deleting at least one of the plurality of resources based on the identified pattern in the monitored data transmissions. For example, the processing unit 102 of the node 100 may delete an empty or unused resource or remove a resource partition.

In an embodiment where the identified pattern in the monitored data transmissions comprises a latency value for data transmissions between the plurality of resources then, if the latency value for data transmissions between two of the plurality of resources is more than the first threshold value, the distribution of the plurality of resources at the node of the network may be adapted by moving the two of the plurality of resources closer to each other.

In an embodiment where the identified pattern in the monitored data transmissions comprises a value for the number of data transmissions between the plurality of resources then, if the value for the number of data transmissions between two of the plurality of resources is more than the second threshold value, the distribution of the plurality of resources at the node of the network may be adapted by moving the two of the plurality of resources closer to each other.

In an embodiment where the identified pattern in the monitored data transmissions comprises a value for the number of data transmissions between the plurality of resources in a set time period then, if the value for the number of data transmissions between the plurality of resources in the set time period is less than a third threshold value, the distribution of the plurality of resources at the node of the network may be adapted by maintaining the distribution of the plurality of resources. On the other hand, if the value for the number of data transmissions between the plurality of resources in the set time period is more than the third threshold value, the distribution of the plurality of resources at the node of the network may be adapted by moving at least one of the plurality of resources from a first location to a second location.

In some embodiments, the processing unit 102 of the node 100 may adapt the distribution of the plurality of resources at the node 100 by first determining an optimum distribution of the plurality of resources at the node 100 based on the identified pattern in the monitored data transmissions using simulated annealing. Then, the processing unit 102 of the node 100 may adapt the distribution of the plurality of resources at the node 100 based on the determined optimum distribution of the plurality of resources at the node 100.

In this way, the distribution of the plurality of resources at the node 100 can be adapted to an optimum distribution, thereby increasing data transmission speeds and reducing a total cost of communication between the plurality of resources.

Figure 3:
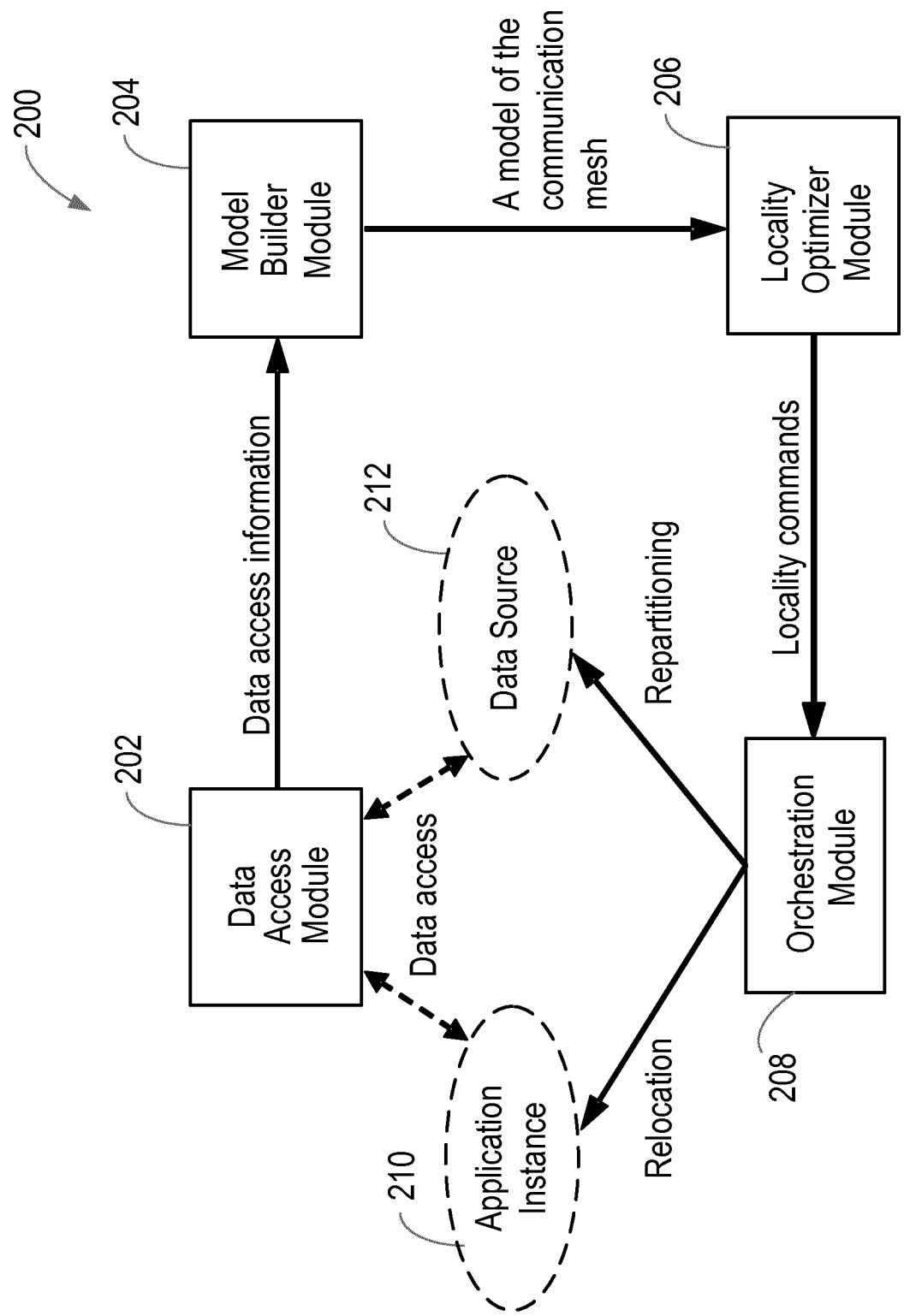
FIG. 3 is a block diagram illustrating a node of a network in use in accordance with an embodiment.

FIG. 3 is a block diagram illustrating the node 200 of the network in use in accordance with an embodiment. In this embodiment, the processing unit (such as the processing unit 106) comprises a data access module 202, a model builder module 204, a locality optimiser module 206 and an orchestration module 208. The plurality of resources according to this embodiment comprise at least one application (or processing) instance 210 and at least one data source (or service) 212.

The at least one application instance 210 can access the at least one data source 212 via the data access module 202. The data access module 202 provides an interface for reading to or from and writing to or from the at least one data source 212. The data access module 202 may be operable to store data access operations received from an application instance 210 in a storage unit (such as the storage unit 102). The data access module 202 may store the data access operations with contextual information. Examples of contextual information include the identity of the application instance 210, the identity of a data partition for the data source 212, a data access key, locality information (such as, a host, a rack, or similar, of the node) indicative of the location of the application instance 210 and the data source 212, the communication cost, or any other type of contextual information or combination thereof.

The data access module 202 is operable to transmit information on received data access operations to the model builder module 204. An example of data access operations received by the data access module 202 is shown in FIG. 4.

Figure 4:
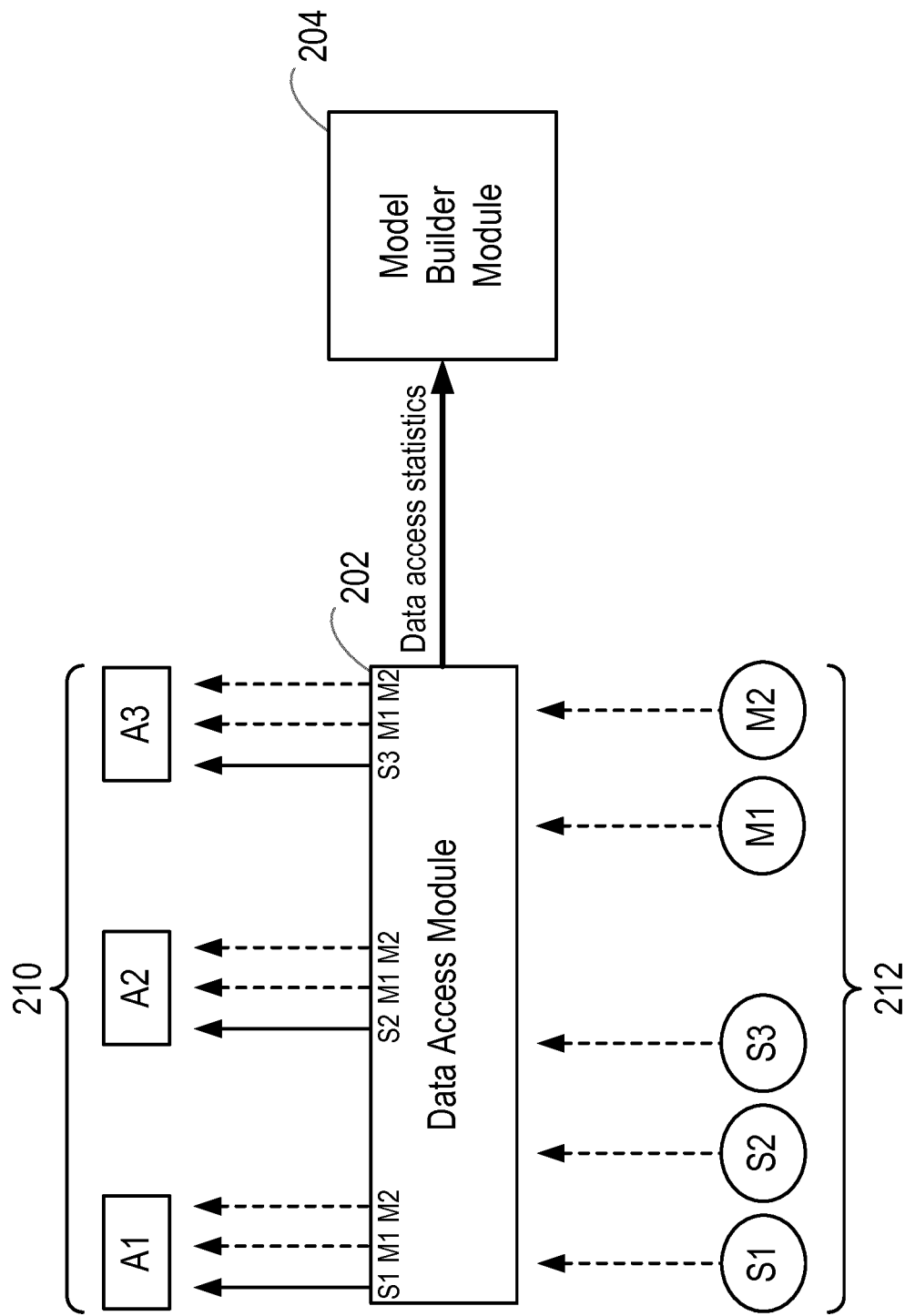
FIG. 4 is a block diagram illustrating a node of a network in use in accordance with an exemplary embodiment.

FIG. 4 is a block diagram illustrating the node 200 of the network in use in accordance with an exemplary embodiment. In this exemplary embodiment, an application A is deployed in multiple instances.

The application A combines data from two different types of data source 212. Specifically, the application A reads data from a data stream S and correlates this with data read from an in-memory database M. The two data sources may have different partitioning keys and partitioning functions, resulting in a full mesh communication. For example, in this exemplary embodiment, each application instance A1, A2, A3 reads data from each database partition M1 and M2 and from one data stream partition S1, S2 and S3. The data access module 202 collects this information on the data access operations and transmits the collected information to the model builder module 204.

Returning again to FIG. 3, based on the information received from the data access module 202, the model builder module 204 identifies a pattern in the data transmissions between resources. For example, the mode builder module 204 generates a model of the communication mesh for the resources (such as for the application instance). The model can include the physical layout of the resources (such as the location of the application instance and the data sources). The model may also include other attributes (such as the communication cost, the access frequencies, the access keys, or similar).

The model builder module 204 may generate the model in the form of a three-tuple comprising a communication pattern matrix P, a resource locality descriptor L, and a set of distance matrices D={$D_1, \ldots, D_t$}. The communication pattern matrix P is a multidimensional matrix that indicates the relationships between different data source partitions based on the usage of those data source partitions. A first dimension of the communication pattern matrix P represents the application instances, while each of the remaining n−1 dimensions of the communications pattern matrix P represent the keyspaces of an input data source. A cell $p_{ijk}$ in the communication pattern matrix P defines the frequency with which the $i^{th}$ application instance accesses the $j^{th}$ key from a first data source in combination with the $k^{th}$ key from a second data source. The model builder module 204 generates the communication pattern matrix P in such a way that the keyspace dimensions are naturally partitioned. In other words, the keys belonging to the same data partition form a block of consecutive indices.

Figure 5:
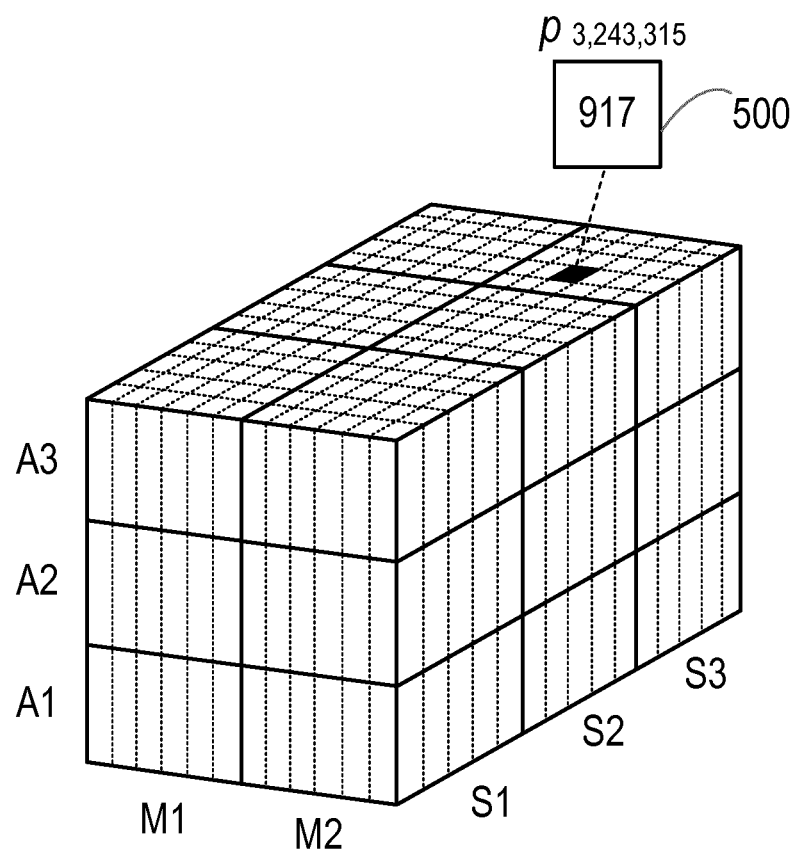
FIG. 5 is a block diagram illustrating a communication pattern matrix in accordance with the exemplary embodiment.

FIG. 5 is a block diagram illustrating a communication pattern matrix in accordance with the exemplary embodiment. Specifically, FIG. 5 shows the communication pattern matrix generated by the model builder module 204 for the application instances A1, A2, A3, the database partitions M1, M2 and the data stream partitions S1, S2, S3 of FIG. 4. The highlighted cell 500 shows the number of times that application instance $A_3$ combined the key 243 from the data base partition $M_2$ with the key 315 from data source partition $S_3$.

The resource locality descriptor L of the communication pattern matrix P defines the location of the application instances A1, A2, A3, the database partitions M1, M2 and the data stream partitions S1, S2, S3. The set of distance matrices, D={$D_1, \ldots, D_t$}, of the communication pattern matrix P define the distance between the application instances and the data source partitions of the $i^{th}$ data source. The (j,k) cell in such a matrix is the distance between the $j^{th}$ application instance and the $k^{th}$ data source partition. The distance can be defined as a function of a hop distance in the resource locality descriptor L, or as a function of measured network latencies collected by the data access module 202.

Figure 6:
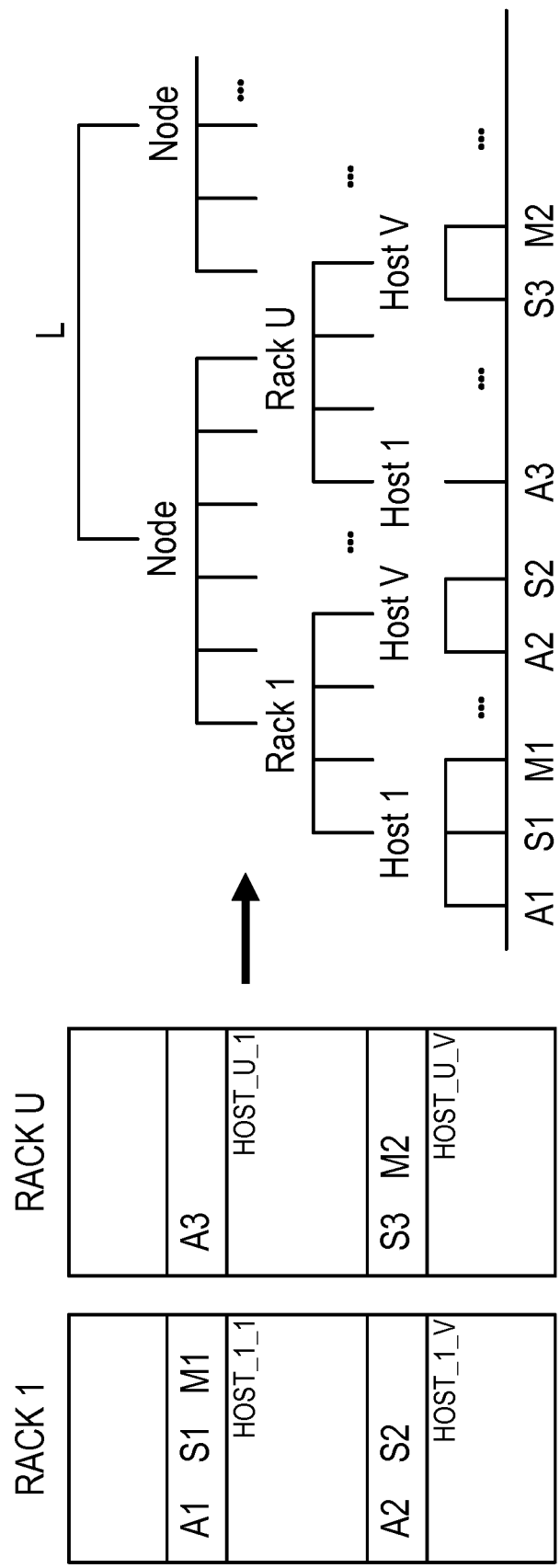
FIG. 6 is a block diagram illustrating a resource distribution at a node in accordance an embodiment.

FIG. 6 is a block diagram illustrating a resource distribution in accordance the exemplary embodiment. Specifically, FIG. 6 shows the physical layout of resources for the application A and the mapping to the resource locality descriptor L. The locality descriptor L indicates the location of the partitions M1, M2, S1, S2, S3 and application instances A1, A2, A3 in the node of FIGS. 4 and 5.

Returning again to FIG. 3, the model builder module 204 transmits the generated model to the locality optimiser module 204. The locality optimiser module 204 receives the model generated by the model builder module 204 and processes the received model to determine if the performance of the node 200 can be improved by employing a local reconfiguration. In other words, based on the model, the locality optimiser module 204 determines if the performance of the node 200 can be improved by adapting a distribution of (i.e. redistributing) a plurality of resources locally.

In some embodiments, the distribution of the plurality of resources at the node of the network can be adapted based on a cost of data transmissions for the distribution, which is determined from the identified pattern in the monitored data transmissions.

The total communication cost of a current distribution of resources can be defined by a cost function c on the communication pattern matrix P and distance matrices D:

total cost=$c(P,D)$.

The locality optimiser module 206 is operable to minimise the total communication cost by altering the physical layout of the communication mesh. This can be achieved in a variety of ways including, for example, implementing one or more repartitioning operations, one or more relocation operations or both. A repartitioning operation can include moving one or more keys from one location to another at the node, adding a resource at the node or at another node in the network (for example, by creating a data partition), deleting a resource at the node or at another node in the network (such as an empty or unused resource), or any other repartitioning operation. A relocation operation can include moving a processing instance to another location (for example, another location at the node or a location at a different node), or any other relocation operation.

In effect, the locality optimiser module 206 determines the optimum distribution for the resources. This can include a redistribution of resources to move closely coupled resources closer to each other, while leaving less frequently communicating resources farther apart. In order to avoid a node becoming overloaded through a redistribution of resources the redistribution of resources may be restricted to the available resources at the nodes. For example, the locality optimiser module 206 may monitor a memory utilisation of the nodes in the network and, if it is determined that a memory utilisation of a node has reached a predefined threshold, the locality optimiser module 206 will not permit a relocation or repartitioning operation on the node that will use memory. For example, the locality optimiser module 206 will not permit resources to be added or moved to that node.

In order to limit the overhead and increase the speed of the process, the locality optimiser module 206 can apply simulated annealing (SA) to approximate the optimum distribution for the resource. The current distribution of resources (i.e. the current state) is randomly reorganised to obtain a new distribution of resources (i.e. a candidate state), which is then accepted or rejected. To generate a candidate state, in each iteration the locality optimiser module 206 either moves an index in the communication pattern matrix P to another partition, or moves a resource horizontally. These steps model the repartitioning and relocation operations. Before evaluating the approximate cost or energy of a candidate state, the locality optimiser module 206 updates the distance matrices $D_i$. The candidate state is then accepted or rejected according to a standard SA procedure. Specifically, the candidate state is accepted or rejected based on a probability distribution that is dependent on the cost gain and system temperature.

The locality optimiser module 206 transmits distribution repartitioning and relocation commands (for example, repartitioning and relocation instructions) to the orchestration module 208. The orchestration module 208 receives the resource distribution repartitioning and relocation commands from the locality optimiser module 206. The orchestration module 208 then executes the received resource distribution commands in the network. For example, in order to repartition a data stream, the orchestration module 208 can reconfigure message routing such that keys are routed to different receiver instances. Similarly, in order to repartition a database, the orchestration module 208 can update a partitioning function and migrate affected data from one database instance to another. The orchestration module 208 can also notify the application instances of the reconfiguration. For example, if a stateful application reads input from a data stream and the routing of the data stream is changed, it may be necessary to transfer some states between application instances.

In some embodiments, the cost function c mentioned earlier is based on environment-specific needs and requirements. It is assumed that the cost of an individual data access is proportional to the distance between a data consumer instance and a data partition that contains the data. The cost of combining a set of keys is the sum of the individual access costs of the involved data elements. The total cost is obtained by summing each of the data combination costs, weighted by the prevalence of the specific combination.

In one embodiment, a first cost of data transmissions for the distribution of the plurality of resources is determined from the identified pattern in the monitored data transmissions. For example, the identified pattern in the monitored data transmissions may comprise at least one distance value indicative of a distance between resources of the plurality of resources for which at least one data transmission occurs and, for each at least one distance value, a corresponding frequency value indicative of the frequency of the at least one data transmission. In this example, the first cost may be determined as the sum of the products of the at least one distance value and corresponding frequency values. The first cost provides a total cost of data transmissions for the current distribution of resources.

In this embodiment, a second cost of data transmissions for a candidate redistribution of the plurality of resources is also determined. As mentioned earlier, the candidate redistribution may be a randomly reorganised distribution of resources acquired by one or more repartitioning operations (such as those mentioned earlier), one or more relocation operations (such as those mentioned earlier), or both. The second cost may be determined in the same way as the first cost. For example, the second cost may be determined as the sum of the products of at least one distance value indicative of a distance between the resources of the plurality of resources for which at least one data transmission occurs and the corresponding frequency values of the at least one data transmission. The second cost provides a total cost of data transmissions for the candidate redistribution of resources.

The determined second cost is compared with the determined first cost. If the determined second cost is less than the determined first cost, the distribution of the plurality of resources at the node are adapted by redistributing the plurality of resources according to the candidate redistribution of the plurality of resources. In this way, the communication cost can be reduced. On the other hand, if the determined second cost is equal to or more than the determined first cost, the distribution of the plurality of resources is maintained. The steps may be repeated for at least one other candidate redistribution. The determined costs can be stored (for example, in the storage unit 106). In this way, the determined costs can later be retrieved.

In an exemplary embodiment, the determination of the total cost C of the combined data transmissions (for example, data access) can be expressed by the following equation:

$$c(P, D) = \sum_{i, j_1, j_2, \ldots, j_t} p_{i, j_1, j_2, \ldots, j_t} \sum_{k=1}^{t} d_{i, j_k}^{k},$$

where:

$d_{i,j_k}^{k}$ are the distance values from the distance matrices D, k is the index of the data source, i is the index of the processing instance, $j_k$ is a partition of the $k^{th}$ data source and k runs from 1 to t, which is the total number of data sources accessed by the processing instance i;

$p_{i, j_1, j_2, \ldots, j_t}$ is the frequency with which the $i^{th}$ processing instance accessed the $j_1^{th}$ partition from the first data source in combination with the $j_2^{th}$ partition from the second data source, and so on, where the sum is for all processing instances (indexed by i) and all i, $j_1$, $j_2$, . . . , $j_t$ data access combinations for the processing instance i; and the cost of a particular combined data access is obtained by multiplying the sum of the distance values d by the corresponding frequency p.

Figure 7:
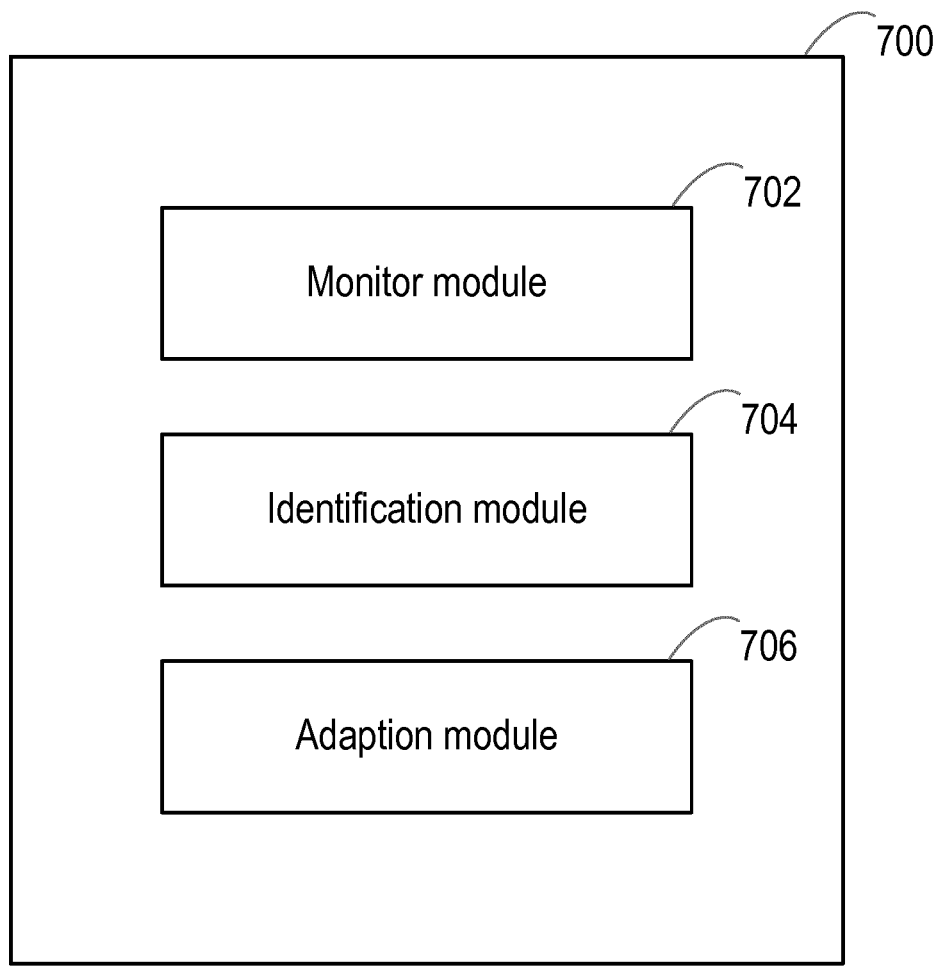
FIG. 7 is a block diagram illustrating a node of a network in accordance with an embodiment.

FIG. 7 is a block diagram illustrating a node 700 of a network in accordance with an embodiment.

With reference to FIG. 7, the node 700 of the network comprises a monitor module 702 configured to monitor data transmissions between a plurality of resources. The node 700 of the network also comprises an identification module 704 configured to identify a pattern in the monitored data transmissions between the plurality of resources. The node 700 of the network also comprises an adaption module 706 configured to adapt a distribution of the plurality of resources based on the identified pattern in the monitored data transmissions.

According to the idea, there is also provided a computer program product comprising a carrier containing instructions for causing a processor to perform at least part of the method described herein.

There is thus provided a node in a network and a method for operating the node that enables optimisation of the physical layout of a plurality of resources at a node of a network. In particular, optimisation of data access of applications in a distributed cloud environment is advantageously provided. A node of a network monitors the physical layout of the communication mesh of an application, determines the optimal location of data sources and application (or processing) instances, and executes necessary relocations in the cloud infrastructure. Advantageously, it is possible to support applications even if where those applications combine multiple input sources. Also, by using an on-line mode of operation, it is possible for the node to continuously adapt the layout of resources to changing conditions.

Therefore, an improved means for distributing resources at a node of a network is advantageously provided.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:
1. A node of a network, the node comprising:
a communications interface; and one or more processors and a storage unit, wherein the storage unit stores program code executable by the one or more processors to:
- monitor data transmissions between a plurality of resources at the node of the network, wherein the plurality of resources comprises a processing instance and multiple data sources accessible by the processing instance, wherein the monitored data transmissions are associated with access by the processing instance to the multiple data sources;
- generate a model that includes a communication pattern matrix, wherein a first dimension of the communication pattern matrix represents the processing instance and wherein other dimensions of the communication pattern matrix represent keyspaces of respective ones of the multiple data sources accessible by the processing instance, wherein keys belonging to a same data source partition form a block of consecutive indices, and wherein each one of multiple cells of the communication pattern matrix for the processing instance indicates how many times the processing instance has accessed a respective combination of keys from the multiple data sources;
- identify, from the generated model, a pattern in the monitored data transmissions between the plurality of resources; and
- redistribute the plurality of resources based on the identified pattern in the monitored data transmissions.

2. The node as claimed in claim 1, wherein the node is a data center.

3. The node as claimed in claim 1, wherein the storage unit stores program code executable by the one or more processors to redistribute the plurality of resources based on the identified pattern in the monitored data transmissions by either:
- moving at least one of the plurality of resources from a first location within the node to a second location within the node based on the identified pattern in the monitored data transmissions; or
- moving at least one of the plurality of resources from a first location within the node to a second location within another node of the network based on the identified pattern in the monitored data transmissions; or
- adding at least one resource to the plurality of resources based on the identified pattern in the monitored data transmissions; or
- deleting at least one of the plurality of resources based on the identified pattern in the monitored data transmissions.

4. The node as claimed in claim 1, wherein the identified pattern in the monitored data transmissions comprises either:
- a distance value for data transmissions between the plurality of resources, wherein the distance value is indicative of a distance between respective resources; or
- a frequency access value for data transmissions between the plurality of resources, wherein the frequency access value is indicative of a frequency with which respective resources access each other; or
- a latency value for data transmissions between the plurality of resources; or
- a value for a number of data transmissions between the plurality of resources; or
- a value for a number of data transmissions between the plurality of resources in a set time period.

5. The node as claimed in claim 1, wherein the identified pattern in the monitored data transmissions comprises a latency value for data transmissions between the plurality of resources, and wherein the storage unit stores program code executable by the one or more processors to, if the latency value for data transmissions between two of the plurality of resources is more than a first threshold value, redistribute the plurality of resources at the node of the network by moving the two of the plurality of resources closer to each other.

6. The node as claimed in claim 1, wherein the identified pattern in the monitored data transmissions comprises a value for a number of data transmissions between the plurality of resources, and wherein the storage unit stores program code executable by the one or more processors to, if the value for the number of data transmissions between two of the plurality of resources is more than a second threshold value, redistribute the plurality of resources at the node of the network by moving the two of the plurality of resources closer to each other.

7. The node as claimed in claim 1, wherein the identified pattern in the monitored data transmissions comprises a value for a number of data transmissions between the plurality of resources in a set time period, and wherein the storage unit stores program code executable by the one or more processors to make a decision as to whether or not to redistribute the plurality of resources at the node based on whether or not the value for the number of data transmissions between the plurality of resources in the set time period is more or less than a third threshold value, and wherein, based on said decision, the plurality of resources is redistributed by moving at least one of the plurality of resources from a first location to a second location.

8. The node as claimed in claim 1, wherein the storage unit stores program code executable by the one or more processors to:
- determine, from the identified pattern in the monitored data transmissions, a first cost of data transmissions for a distribution of the plurality of resources;
- determine a second cost of data transmissions for a candidate redistribution of the plurality of resources;
- compare the determined second cost with the determined first cost; and
- based on the determined second cost being less than the determined first cost, redistribute the plurality of resources according to the candidate redistribution of the plurality of resources.

9. The node as claimed in claim 8, wherein:
- the identified pattern in the monitored data transmissions comprises:
  - at least one distance value indicative of a distance between resources of the plurality of resources for which at least one data transmission occurs; and
  - at least one corresponding frequency value, wherein the at least one corresponding frequency value comprises, for each of the at least one distance value, a corresponding frequency value indicative of a frequency of the at least one data transmission; and
- the first cost is determined as a sum of products of the at least one distance value and the at least one corresponding frequency value.

10. The node as claimed in claim 1, wherein the storage unit stores program code executable by the one or more processors to redistribute the plurality of resources at the node of the network by:
- determining an optimum distribution of the plurality of resources at the node of the network based on the identified pattern in the monitored data transmissions using simulated annealing; and redistributing the plurality of resources at the node based on the determined optimum distribution of the plurality of resources at the node of the network.

11. The node as claimed in claim 1, wherein the generated model models a physical layout of the plurality of resources and the data transmissions between the plurality of resources.

12. The node as claimed in claim 1, wherein two or more of the multiple data sources are data sources of different types.

13. The node as claimed in claim 1, wherein the storage unit stores program code executable by the one or more processors to monitor the data transmissions between the plurality of resources at the node by monitoring a full communication mesh between the plurality of resources.

14. The node as claimed in claim 1, wherein the model further includes a resource locality descriptor and a set of distance matrices, wherein the resource locality descriptor indicates locations of the plurality of resources, and wherein the set of distance matrices indicates distances between the processing instance and the multiple data sources.

15. A method of operating a node of a network, the method comprising:
monitoring data transmissions between a plurality of resources at the node of the network, wherein the plurality of resources comprises a processing instance and multiple data sources accessible by the processing instance, wherein the monitored data transmissions are associated with access by the processing instance to the multiple data sources;
generating a model that includes a communication pattern matrix, wherein a first dimension of the communication pattern matrix represents the processing instance and wherein other dimensions of the communication pattern matrix represent keyspaces of respective ones of the multiple data sources accessible by the processing instance, wherein keys belonging to a same data source partition form a block of consecutive indices, and wherein each one of multiple cells of the communication pattern matrix for the processing instance indicates how many times the processing instance has accessed a respective combination of keys from the multiple data sources;
identifying, from the generated model, a pattern in the monitored data transmissions between the plurality of resources at the node of the network; and
redistributing the plurality of resources at the node of the network based on the identified pattern in the monitored data transmissions.

16. The method as claimed in claim 15, wherein redistributing the plurality of resources based on the identified pattern in the monitored data transmissions comprises either:
moving at least one of the plurality of resources from a first location within the node to a second location within the node based on the identified pattern in the monitored data transmissions; or
moving at least one of the plurality of resources from a first location within the node to a second location within another node of the network based on the identified pattern in the monitored data transmissions; or
adding at least one resource to the plurality of resources based on the identified pattern in the monitored data transmissions; or
deleting at least one of the plurality of resources based on the identified pattern in the monitored data transmissions.

17. The method as claimed in claim 15, wherein the identified pattern in the monitored data transmissions comprises either:
a distance value for data transmissions between the plurality of resources, wherein the distance value is indicative of a distance between respective resources; or
a frequency access value for data transmissions between the plurality of resources, wherein the frequency access value is indicative of a frequency with which respective resources access each other; or
a latency value for data transmissions between the plurality of resources; or
a value for a number of data transmissions between the plurality of resources; or
a value for a number of data transmissions between the plurality of resources in a set time period.

18. The method as claimed in claim 15, wherein the identified pattern in the monitored data transmissions comprises a latency value for data transmissions between the plurality of resources, and wherein the method comprises, if the latency value for data transmissions between two of the plurality of resources is more than a first threshold value, redistributing the plurality of resources at the node of the network by moving the two of the plurality of resources closer to each other.

19. The method as claimed in claim 15, wherein the identified pattern in the monitored data transmissions comprises a value for a number of data transmissions between the plurality of resources, and wherein the method comprises, if the value for the number of data transmissions between two of the plurality of resources is more than a second threshold value, redistributing the plurality of resources at the node of the network by moving the two of the plurality of resources closer to each other.

20. The method as claimed in claim 15, wherein the identified pattern in the monitored data transmissions comprises a value for a number of data transmissions between the plurality of resources in a set time period, and wherein the method comprises making a decision as to whether or not to redistribute the plurality of resources at the node based on whether or not the value for the number of data transmissions between the plurality of resources in the set time period is more or less than a third threshold value, and wherein said redistributing comprises, based on said decision, redistributing the plurality of resources by moving at least one of the plurality of resources from a first location to a second location.

21. The method as claimed in claim 15, further comprising:
determining a first cost of data transmissions for the distribution of the plurality of resources from the identified pattern in the monitored data transmissions;
determining a second cost of data transmissions for a candidate redistribution of the plurality of resources;
comparing the determined second cost with the determined first cost; and
based on the determined second cost being less than the determined first cost redistributing the plurality of resources according to the candidate redistribution of the plurality of resources.

22. The method as claimed in claim 21, wherein:
the identified pattern in the monitored data transmissions comprises:

at least one distance value indicative of a distance between resources of the plurality of resources for which at least one data transmission occurs; and at least one corresponding frequency value, wherein the at least one corresponding frequency value comprises, for each of the at least one distance value, a corresponding frequency value indicative of a frequency of the at least one data transmission; and the first cost is determined as a sum of products of the at least one distance value and the at least one corresponding frequency value.

23. The method as claimed in claim 15, wherein redistributing the plurality of resources at the node of the network comprises:

determining an optimum distribution of the plurality of resources at the node of the network based on the identified pattern in the monitored data transmissions using simulated annealing; and redistributing the plurality of resources at the node based on the determined optimum distribution of the plurality of resources at the node of the network.

24. The method as claimed in claim 15, wherein two or more of the multiple data sources are data sources of different types.

25. The method as claimed in claim 15, wherein monitoring the data transmissions between the plurality of resources at the node comprises monitoring a full communication mesh between the plurality of resources.

* * * * *